(12) United States Patent
Li et al.

(10) Patent No.: US 9,891,768 B2
(45) Date of Patent: Feb. 13, 2018

(54) TOUCH PANEL, ITS MANUFACTURING METHOD AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Kefeng Li, Beijing (CN); Ming Hu, Beijing (CN); Taofeng Xie, Beijing (CN); Ting Zeng, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 140 days.

(21) Appl. No.: 14/797,429

(22) Filed: Jul. 13, 2015

(65) Prior Publication Data

US 2016/0179233 A1     Jun. 23, 2016

(30) Foreign Application Priority Data

Dec. 19, 2014   (CN) .......................... 2014 1 0795511

(51) Int. Cl.
*G06F 3/044*     (2006.01)
(52) U.S. Cl.
CPC .... *G06F 3/044* (2013.01); *G06F 2203/04111* (2013.01)

(58) Field of Classification Search
CPC ...................... G06F 3/041; G06F 2203/04103
See application file for complete search history.

(56) References Cited

U.S. PATENT DOCUMENTS

| 2010/0026661 | A1 | 2/2010 | Teramoto |
| 2011/0134055 | A1* | 6/2011 | Jung ...................... G06F 3/044 345/173 |

FOREIGN PATENT DOCUMENTS

| CN | 101630215 A | 1/2010 |
| CN | 103294242 A | 9/2013 |

OTHER PUBLICATIONS

Office Action in Chinese Patent Application No. 201410795511.7, dated Nov. 21, 2016.

* cited by examiner

*Primary Examiner* — Shaheda Abdin
(74) *Attorney, Agent, or Firm* — Brooks Kushman P.C.

(57) ABSTRACT

The present disclosure provides a touch panel, its manufacturing method and a touch display panel. A bridging point member of a bridging line, through which sensing electrodes in the touch panel are electrically connected to each other, is provided with at least one via-hole, so as to provide the bridging point member with a hollowed-out pattern.

14 Claims, 3 Drawing Sheets

US 9,891,768 B2

TOUCH PANEL, ITS MANUFACTURING METHOD AND TOUCH DISPLAY DEVICE

CROSS-REFERENCE TO RELATED APPLICATION

The present application claims a priority of the Chinese patent application No. 201410795511.7 filed on Dec. 19, 2014, which is incorporated herein by reference in its entirety.

TECHNICAL FIELD

The present disclosure relates to the field of display technology, in particular to a touch panel, its manufacturing method and a touch display device.

BACKGROUND

Touch panels, as commonly-used human-computer interactive devices, can provide an intuitive and vivid human-computer interactive experience, and thus have been widely used in such fields as electronics and display.

Currently, the widely-used touch panels may include self-capacitive touch panels and mutual-capacitive touch panels. For the self-capacitive touch panel, a first electrode and a second electrode, i.e., sensing electrodes, for determining position information about a touch point are arranged on an identical substrate, and through a bridge-type or tunnel-type structure, the sensing electrodes in an identical row or column are electrically connected to each other via a bridging line, so as to determine an X-axis or Y-axis coordinate of the touch point.

In the related art, a bridging point member where the bridging line is in contact with the sensing electrode adopts a stackable design, i.e., the bridging point member of the bridging line as a whole is directly formed on the sensing electrode. However, for this design, there exist such defects as a reduced adhesive force at a stacking position, an imperfect electro-static discharge (ESD) performance, and a visible bridging point member caused by reflection.

SUMMARY

An object of the present disclosure is to provide a touch panel, its manufacturing method and a touch display device, so as to increase an adhesive force at a position where a bridging line is in contact with a sensing electrode, improve a contact behavior of the sensing electrode and the bridging line, and improve the ESD performance of the touch panel.

In one aspect, the present disclosure provides in one embodiment a touch panel, including a plurality of sensing electrodes arranged in a crisscross manner and insulated from each other, and a plurality of bridging lines through which the sensing electrodes are electrically connected to each other. Each bridging line includes: bridging point members arranged at both ends of the bridging line and coming into contact with the sensing electrodes; and a connection member electrically connected to the bridging point member. The bridging point member is provided with at least one via-hole.

Alternatively, the bridging point member is of a trapezoidal shape.

Alternatively, the sensing electrode in contact with the bridging point member is filled into the via-hole.

Alternatively, the via-hole is of a square, rectangular, triangular, rhombic, circular, elliptical or trapezoidal shape.

Alternatively, the connection member includes at least two metal lines.

Alternatively, the bridging line is arranged above a base substrate.

Alternatively, the touch panel further includes an insulating layer arranged on the bridging line.

Alternatively, the touch panel further includes a black matrix arranged on the base substrate.

Alternatively, the touch panel further includes a metal lead arranged on the black matrix.

Alternatively, the metal lead is electrically connected to the corresponding sensing electrode so as to transmit a touch signal.

Alternatively, the sensing electrodes include first sensing electrodes and second sensing electrodes arranged in a crisscross manner and insulated from each other, and connection lines through which the second sensing electrodes are longitudinally electrically connected to each other. The first sensing electrodes are horizontally electrically connected to each other through the bridging lines.

In another aspect, the present disclosure provides in one embodiment a touch display device including the above-mentioned touch panel.

In yet another aspect, the present disclosure provides in one embodiment a method for manufacturing a touch panel, including steps of:

forming a black matrix on a base substrate by a first mask process;

forming bridging lines on the base substrate and forming a metal lead on the black matrix by a second mask process, each bridging line including a bridging point member and a connection member, the bridging point member being provides with at least one via-hole;

forming an insulating layer on the bridging lines by a third mask process, the insulating layer being located between the bridging lines and sensing electrodes across the bridging lines; and forming the sensing electrodes by a fourth mask process, the sensing electrodes including first sensing electrodes electrically connected to the bridging lines and second sensing electrodes across the bridging lines.

According to the touch pane, its manufacturing method and the touch display device in the embodiments of the present disclosure, the bridging point member of the bridging line, through which the sensing electrodes in the touch panel are electrically connected to each other, is provided with at least one via-hole, so as to provide the bridging point member with a hollowed-out pattern, thereby to increase the adhesive force at a position where the bridging line is in contact with the sensing electrode, improve the contact behavior of the sensing electrode and the bridging line, and improve the ESD performance of the touch panel.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
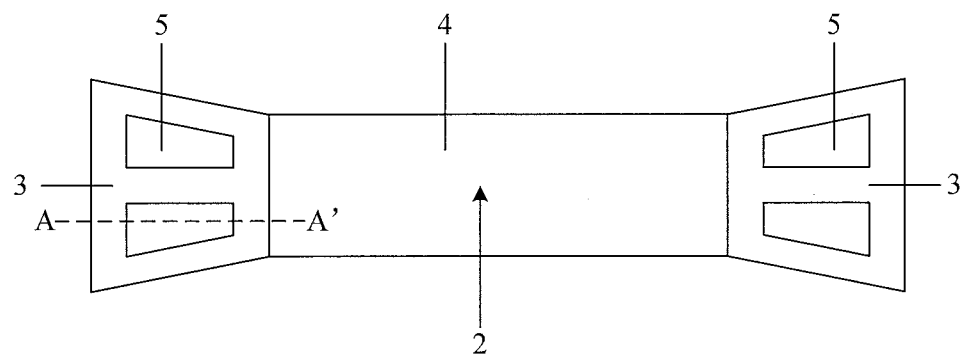
FIG. 1 is a schematic view showing a bridging line in a touch panel according to one embodiment of the present disclosure.

The present disclosure provides in one embodiment a touch panel, which includes a plurality of sensing electrodes 1 arranged in a crisscross manner and insulated from each other, and a plurality of bridging lines 2 through which the sensing electrodes 1 are electrically connected to each other. As shown in FIG. 1, each bridging line 2 may include: bridging point members 3 arranged at both ends of the bridging line 2 and coming into contact with the sensing electrodes 1; and a connection member 4 electrically connected to the bridging point members 3. The bridging point member 3 is provided with at least one via-hole 5, so as to provide the bridging point member 3 with a hollowed-out pattern.

According to the structure of the bridging line 2 in this embodiment, the bridging point member 3 in contact with the sensing electrode 1 is provided with the hollowed-out pattern, so as to reduce the possibility of bubbles occurring at a stacking position between the bridging point member 3 and the sensing electrode 1, thereby to increase an adhesive force at a position where the bridging line is in contact with the sensing electrode, improve a contact behavior of the sensing electrode and the bridging line, and improve an ESD performance of the touch panel.

In the embodiments of the present disclosure, the bridging point member 3 may be enlarged, and the hollowed-out pattern may be formed at the bridging point member 3 through the formation of a hole, so as to increase the adhesive force at the position where the bridging line 2 is in contact with the sensing electrode 1, and improve the contact behavior of the sensing electrode 1 and the bridging line 2, without increasing an actual coverage area of the bridging point member 3 and the amount of materials. In addition, the bridging point member 3 of the bridging line 2 actually consists of a plurality of conductive lines electrically connected to each other, and as compared with the related art where a single-pieced bridging point member is adopted, it is able to prevent the occurrence of the visible bridging point member 3 caused by reflection.

Figure 3:
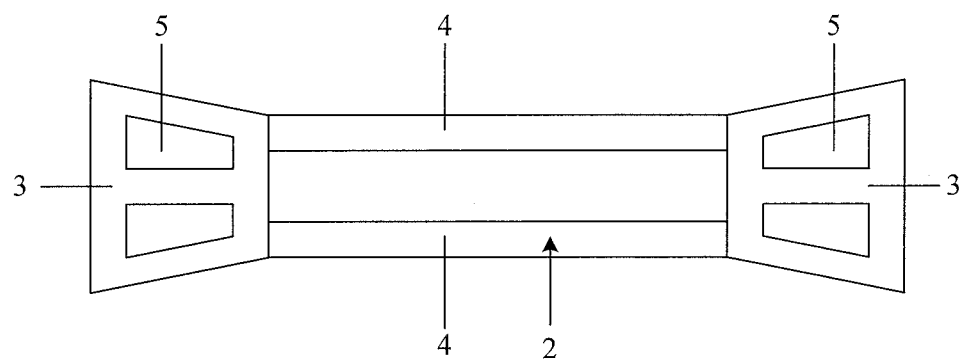
FIG. 3 is another schematic view showing the bridging line in the touch panel according to one embodiment of the present disclosure.

The bridging point member 3 may be of a geometrical shape, e.g., a square, rectangular, triangular, rhombic, circular, elliptical or trapezoidal (as shown in FIGS. 1 and 3) shape. In addition, the via-hole 5 may also be of any shape, e.g., a trapezoidal shape as shown in FIGS. 1 and 3, so as to provide the bridging point member 3 with the desired hollowed-out pattern.

Figure 2:
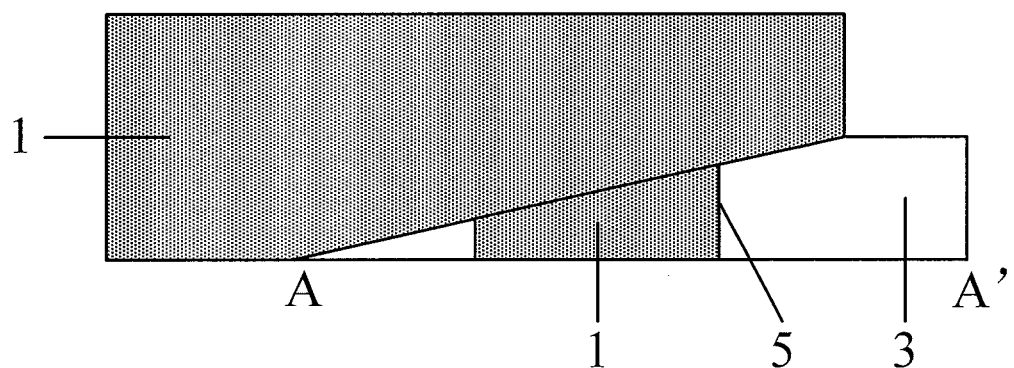
FIG. 2 is a sectional view of FIG. 1 along line A-A' after the bridging line is in contact with a sensing electrode according to one embodiment of the present disclosure.

In an alternative embodiment, as shown in FIG. 2, the sensing electrode 1 in contact with the bridging point member 3 may be filled into the via-hole 5, i.e., a portion of the sensing electrode 1 may be formed within the via-hole 5, so as to embed the bridging point member 3 into the sensing electrode 1. In this way, it is able not only to increase a contact area between the bridging point member 3 and the sensing electrode 1, improve the contact behavior of the bridging point member 3 and the sensing electrode 1 and improve the ESD performance of the touch panel, but also to increase, by clamping, the adhesive force between the bridging point member 3 and the sensing electrode 1.

In an alternative embodiment, as shown in FIG. 3, the connection member 4 of the bridging line 2 may include at least two metal lines. In this way, it is able not only to enable the connection member 4 to function as an electrical connector, but also to reduce the amount of materials of the connection member 4, thereby to reduce the production cost of the touch panel.

Figure 4:
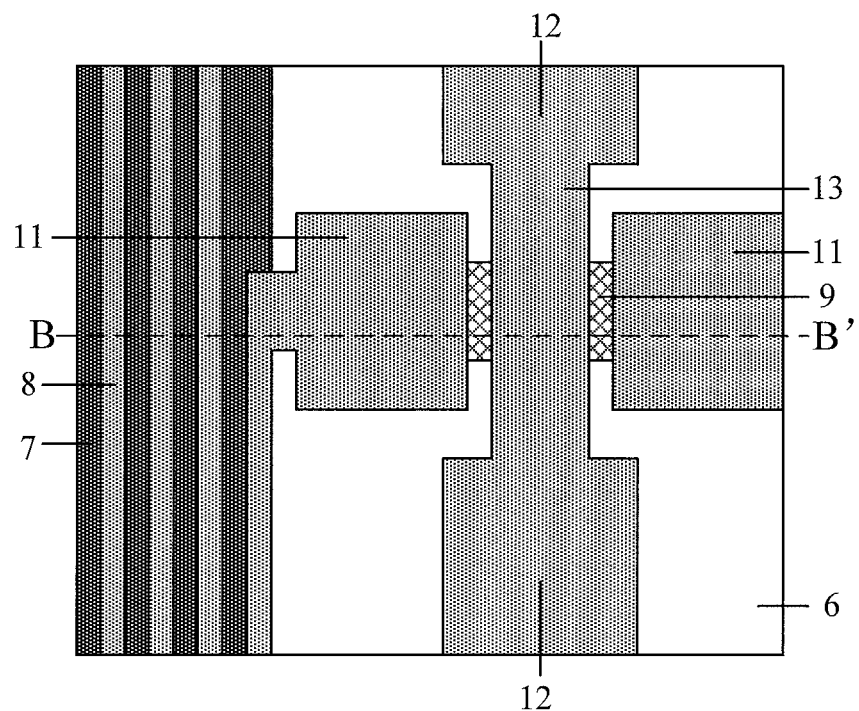
FIG. 4 is a schematic view showing the touch panel according to one embodiment of the present disclosure.
Figure 5:
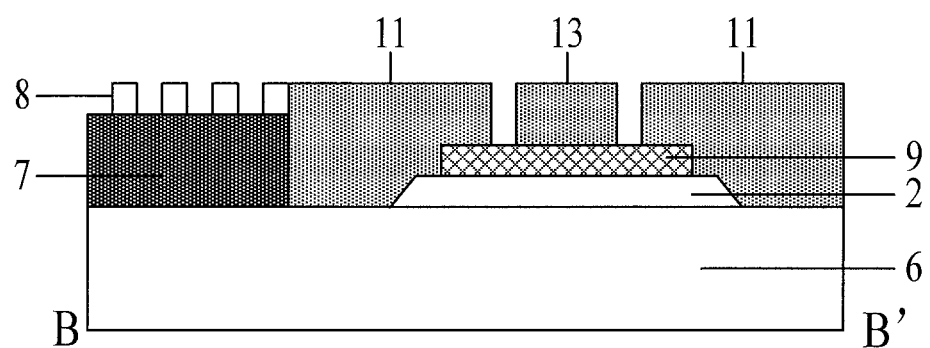
FIG. 5 is a sectional view of FIG. 4 along line B-B'.

A partial structure of the touch panel is shown in FIG. 4 (a top view) and FIG. 5 (a sectional view). To be specific, the touch panel may include: a base substrate 6; the bridging line 2 arranged on the base substrate 6; a black matrix 7 arranged on the base substrate 6; a metal lead 8 arranged on the black matrix; an insulating layer 9 arranged on the bridging line 2; and the sensing electrode 1.

In this embodiment, the sensing electrodes 1 may include first sensing electrodes 11 and second sensing electrodes 12 arranged in a crisscross manner and insulated from each other, and connection lines 13 through which the second sensing electrodes 12 are longitudinally electrically connected to each other. The first sensing electrodes 11 may be horizontally electrically connected to each other through the bridging lines 2. In this way, it is able to determine position information about a touch point in accordance with a touch signal detected by the first sensing electrode 11 and the second sensing electrode 12.

It should be appreciated that, the touch panel in FIGS. 4 and 5 is for illustrative purposes only, but shall not be used to limit the structure thereof The metal lead 8 may be electrically connected to the corresponding sensing electrode 1, so as to transmit the touch signal.

Figure 6:
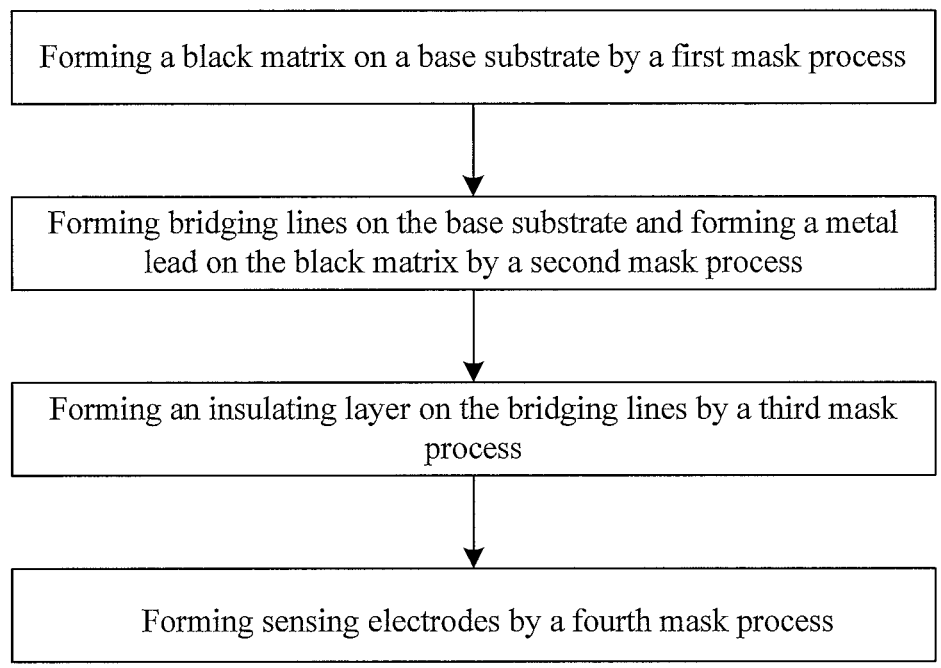
FIG. 6 is a flow chart of a method for manufacturing the touch panel according to one embodiment of the present disclosure.

The touch panel may be manufactured by four mask processes. To be specific, as shown in FIG. 6, a method for manufacturing the touch panel includes steps of:

forming the black matrix 7 on the base substrate 6 by a first mask process;

forming the bridging lines 2 on the base substrate 6 and forming the metal lead 8 on the black matrix 7 by a second mask process, each bridging line 2 including the bridging point member 3 and the connection member 4, the bridging point member 3 being provided with at least one via-hole 5 so as to provide the bridging point member 3 with the hollowed-out pattern, thereby to increase the adhesive force at the position where the bridging line 2 is in contact with the sensing electrode 1, improve the contact behavior of the sensing electrode 1 and the bridging line 2, and improve the ESD performance of the touch panel;

forming the insulating layer 9 at a corresponding position by a third mask process, the insulating layer 9 being generally located between the bridging lines 2 and sensing electrodes 1 across the bridging lines 2, i.e., located on the bridging lines 2; and forming the sensing electrodes 1 by a fourth mask process, the sensing electrodes 1 including the first sensing electrodes 11 electrically connected to the bridging lines 2 and the second sensing electrodes 12 across the bridging lines 2.

The present disclosure further provides in one embodiment a touch display device which includes the above-mentioned touch panel.

According to the touch pane, its manufacturing method and the touch display device in the embodiments of the present disclosure, the bridging point member of the bridging line, through which the sensing electrodes in the touch panel are electrically connected to each other, is provided with at least one via-hole, so as to provide the bridging point member with the hollowed-out pattern, thereby to increase the adhesive force at the position where the bridging line is in contact with the sensing electrode, improve the contact behavior of the sensing electrode and the bridging line, and improve the ESD performance of the touch panel.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch panel, comprising a plurality of sensing electrodes arranged in a crisscross manner and insulated from each other, and a plurality of bridging lines through which the sensing electrodes are electrically connected to each other, wherein each bridging line comprises:
   bridging point members arranged at both ends of the bridging line and coming into contact with the sensing electrodes; and
   a connection member electrically connected to the bridging point member,
   wherein the bridging point member is provided with at least one via-hole,
   wherein each bridging point member includes a plurality of conductive lines electrically connected to each other.

2. The touch panel according to claim 1, wherein the bridging point member is of a trapezoidal shape.

3. The touch panel according to claim 1, wherein a sensing electrode in contact with the bridging point member is filled into the via-hole.

4. The touch panel according to claim 1, wherein the via-hole is of a square, rectangular, triangular, rhombic, circular, elliptical or trapezoidal shape.

5. The touch panel according to claim 1, wherein the connection member includes at least two metal lines.

6. The touch panel according to claim 1, wherein the bridging line is arranged on a base substrate.

7. The touch panel according to claim 6, further comprising an insulating layer arranged on the bridging line.

8. The touch panel according to claim 1, further comprising an insulating layer arranged on the bridging line.

9. The touch panel according to claim 1, further comprising a black matrix and a base substrate, wherein the black matrix is arranged on the base substrate.

10. The touch panel according to claim 9, further comprising a metal lead arranged on the black matrix.

11. The touch panel according to claim 10, wherein the metal lead is electrically connected to the corresponding sensing electrode, so as to transmit a touch signal.

12. The touch panel according to claim 1, wherein the sensing electrodes comprise first sensing electrodes and second sensing electrodes arranged in a crisscross manner and insulated from each other, and connection lines through which the second sensing electrodes are longitudinally electrically connected to each other, and the first sensing electrodes are horizontally electrically connected to each other through the bridging lines.

13. A touch display device, comprising the touch panel according to claim 1.

14. A method for manufacturing a touch panel, comprising steps of:
   forming a black matrix on a base substrate by a first mask process;
   forming bridging lines on the base substrate and forming a metal lead on the black matrix by a second mask process, each bridging line including a bridging point member and a connection member, the bridging point member including a plurality of conductive lines electrically connected to each other;
   forming an insulating layer on the bridging lines by a third mask process, the insulating layer being located between the bridging lines and sensing electrodes across the bridging lines; and
   forming the sensing electrodes by a fourth mask process, the sensing electrodes including first sensing electrodes electrically connected to the bridging lines and second sensing electrodes across the bridging lines.

* * * * *